United States Patent
Iida et al.

(10) Patent No.: US 12,415,581 B2
(45) Date of Patent: Sep. 16, 2025

(54) OPTICAL AXIS POSITION ADJUSTING METHOD AND OPTICAL AXIS POSITION ADJUSTER FOR IN-VEHICLE CAMERA

(71) Applicant: TOYOTA JIDOSHA KABUSHIKI KAISHA, Toyota (JP)

(72) Inventors: Taiki Iida, Nisshin (JP); Yusuke Tatesumi, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/462,763

(22) Filed: Sep. 7, 2023

(65) Prior Publication Data

US 2024/0158031 A1    May 16, 2024

(30) Foreign Application Priority Data

Nov. 15, 2022    (JP) ................. 2022-182847

(51) Int. Cl.
*G01B 11/27* (2006.01)
*B60R 11/04* (2006.01)
*B62D 65/02* (2006.01)

(52) U.S. Cl.
CPC ............ *B62D 65/026* (2013.01); *B60R 11/04* (2013.01)

(58) Field of Classification Search
CPC ............................ B62D 65/026; B60R 11/04
See application file for complete search history.

(56) References Cited

U.S. PATENT DOCUMENTS

| | | | |
|---|---|---|---|
| 10,427,689 B2 | 10/2019 | Tokimasa et al. | |
| 10,486,698 B2 | 11/2019 | Masui et al. | |
| 10,731,996 B2 | 8/2020 | Naito | |
| 10,922,561 B2 | 2/2021 | Ozawa et al. | |
| 11,017,247 B2 | 5/2021 | Hayashi et al. | |
| 11,072,328 B2 | 7/2021 | Masui et al. | |
| 11,235,766 B2 | 2/2022 | Masui et al. | |
| 11,247,671 B2 | 2/2022 | Komori | |
| 2014/0218506 A1* | 8/2014 | Trombley | B62D 15/027 348/113 |
| 2020/0326191 A1 | 10/2020 | Naito | |
| 2021/0364631 A1 | 11/2021 | Hasegawa et al. | |

FOREIGN PATENT DOCUMENTS

| | | | | |
|---|---|---|---|---|
| JP | 2001285681 A | * | 10/2001 | ............... G06T 7/80 |
| JP | 2015-020551 A | | 2/2015 | |
| JP | 2019051786 A | * | 4/2019 | |

* cited by examiner

*Primary Examiner* — Patrick E Demosky
(74) *Attorney, Agent, or Firm* — SoraIP, Inc.

(57) ABSTRACT

An optical axis position adjuster according to the present disclosure includes a target board, a leg portion that supports the target board, and an installation auxiliary jig that connects the leg portion and the vehicle. The leg portions can be installed horizontally with respect to the ground. The installation auxiliary jig is connected to a connecting portion provided in the leg portion and is connected to an emblem provided in the vehicle. The connecting portion is disposed at the center of the leg portion, and the emblem is disposed at the center of the vehicle in the vehicle width direction. Therefore, it is possible to connect the vehicle and the leg portions such that the center of the target board and the center of the vehicle in the vehicle width direction coincide with each other in a plan view.

9 Claims, 6 Drawing Sheets

FIG. 1
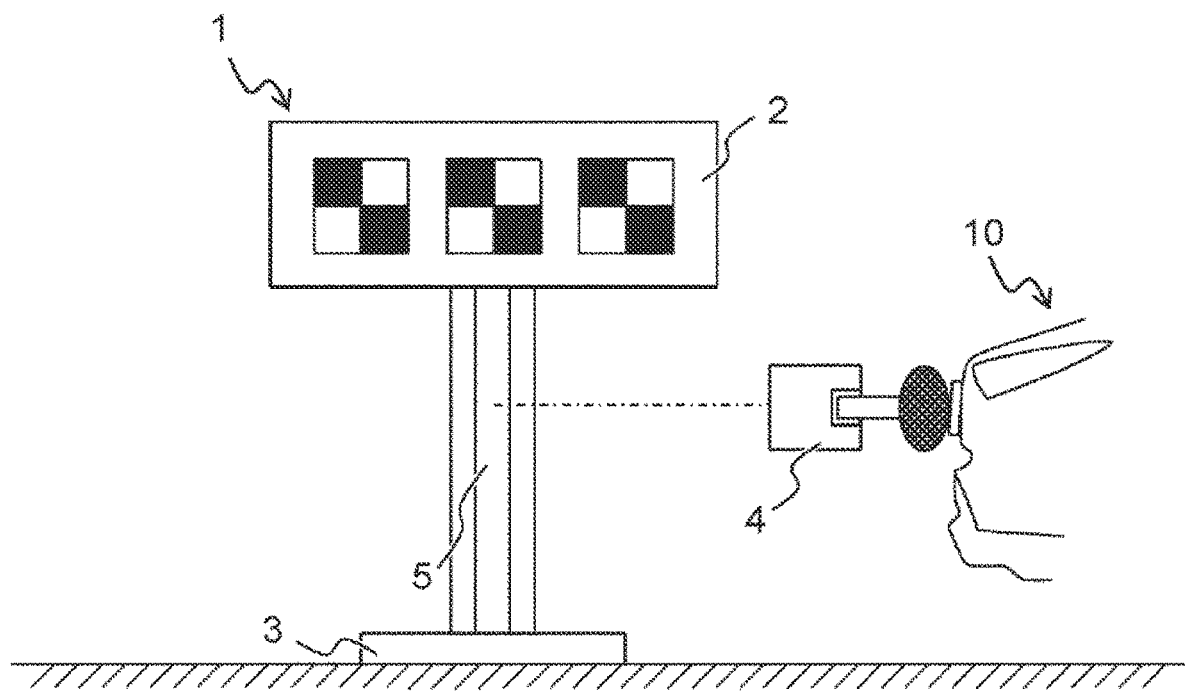
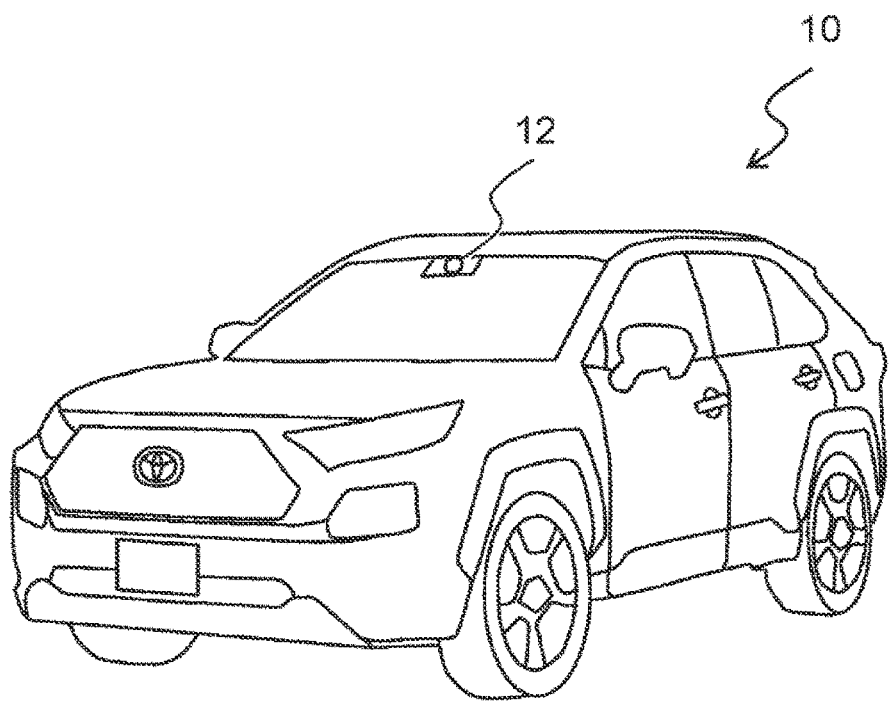

FIG. 4A
PRIOR ART
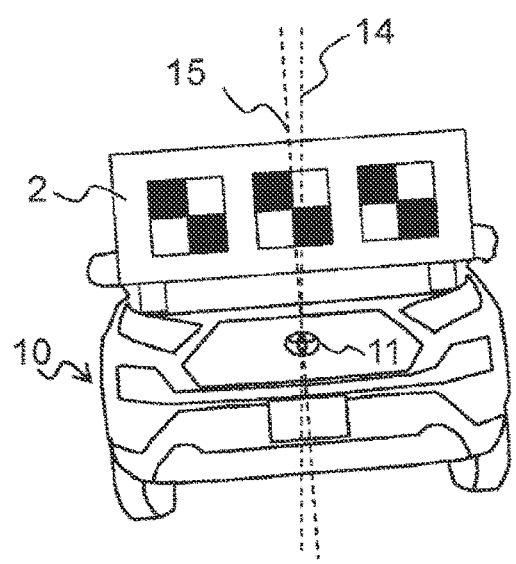
THIS EMBODIMENT
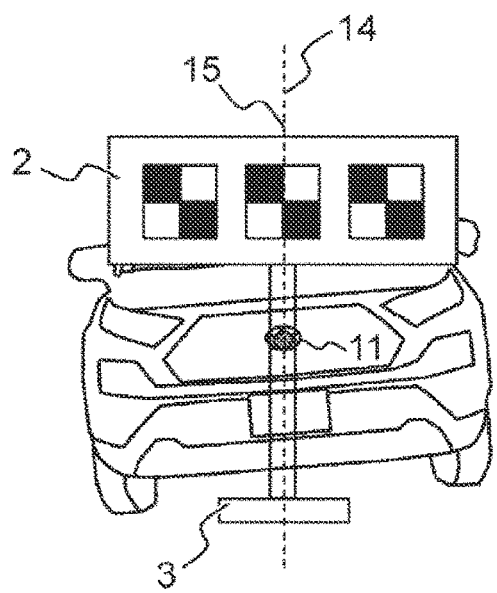
FIG. 4B
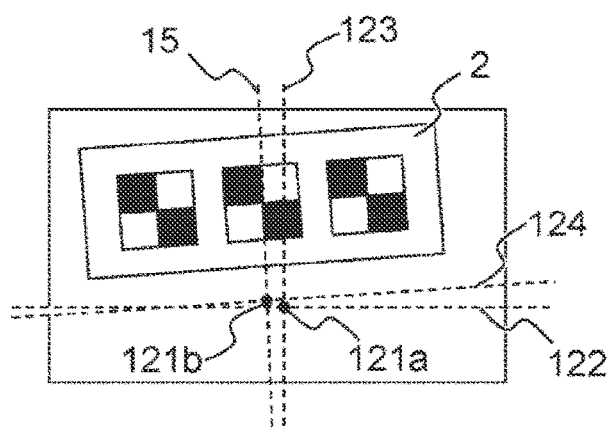
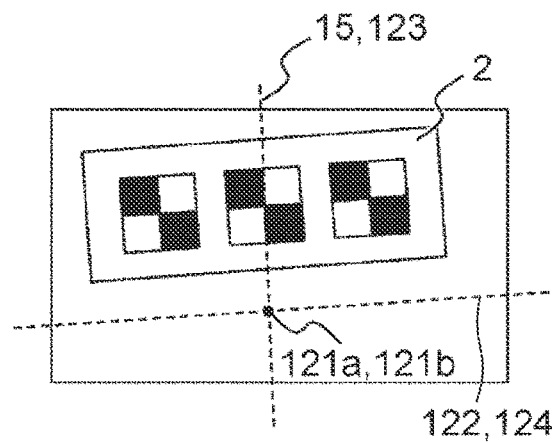

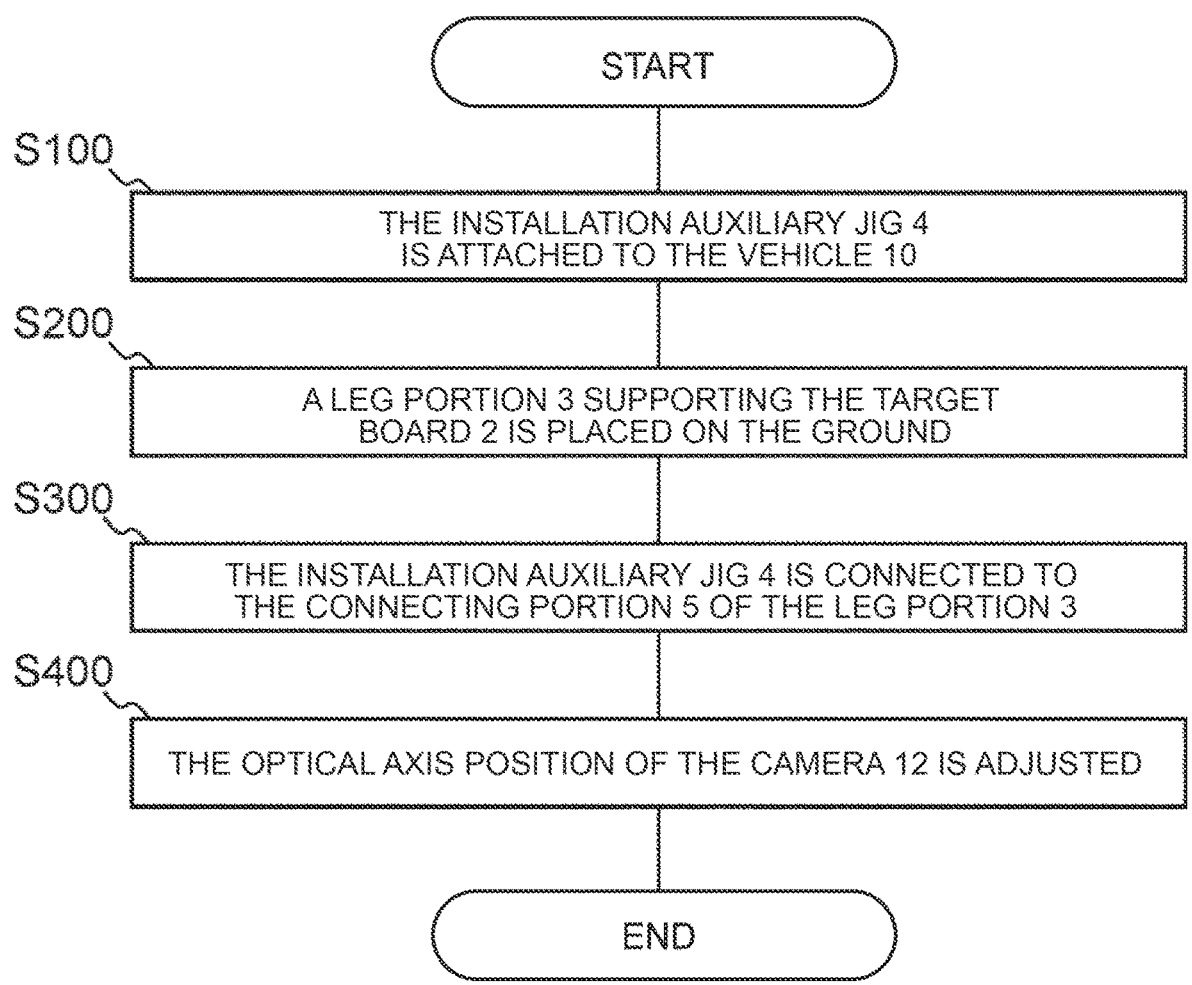

OPTICAL AXIS POSITION ADJUSTING METHOD AND OPTICAL AXIS POSITION ADJUSTER FOR IN-VEHICLE CAMERA

CROSS-REFERENCE TO RELATED APPLICATION

This application claims priority to Japanese Patent Application No. 2022-182847 filed on Nov. 15, 2022, incorporated herein by reference in its entirety.

BACKGROUND

1. Technical Field

The present disclosure relates to an optical axis position adjusting method and an optical axis position adjuster for a camera mounted on a vehicle.

2. Description of Related Art

Japanese Unexamined Patent Application Publication No. 2019-051786 (JP 2019-051786 A) discloses a method in which laser pointers for outputting two visible rays on the same vertical plane are prepared, and a target board is installed at the center of the vehicle in a vehicle width direction by adjusting each laser pointer such that the laser pointer points an emblem provided in a front portion and a rear portion of the vehicle.

SUMMARY

The optical axis position adjustment of a camera mounted on a vehicle cannot be accurately performed unless the center of the vehicle in a vehicle width direction is aligned with the center of a target board. Conventionally, marking is required by a plurality of workers in order to obtain a vehicle centerline in the vehicle width direction. The optical axis position of the camera was adjusted using the target board installed on the vehicle centerline drawn by marking.

The present disclosure provides an optical axis position adjuster capable of easily adjusting the optical axis position of the camera mounted on the vehicle without performing marking for visualizing the vehicle centerline or fine adjustment of a target board installation position. Further, a vehicle inspection method using the optical axis position adjuster is provided.

A first aspect of the present disclosure relates to an optical axis position adjuster.

The optical axis position adjuster includes:
a target board for adjusting an optical axis position of a camera mounted on a vehicle;
a leg portion for supporting the target board; and
an installation auxiliary jig that connects the leg portion to the vehicle such that a vehicle centerline passing through a center of a vehicle width of the vehicle in a plan view coincides with a leg portion centerline passing through a center of a width of the leg portion in the plan view.

A second aspect of the present disclosure relates to an optical axis position adjusting method.

The optical axis position adjusting method includes:
a step of installing a leg portion for supporting a target board to a ground such that the target board is perpendicular to the ground;
a step of connecting the leg portion and a vehicle by using an installation auxiliary jig such that a vehicle centerline passing through a center of a vehicle width of the vehicle in a plan view coincides with a leg portion centerline passing through a center of a width of the leg portion in the plan view; and
a step of adjusting an optical axis position of a camera mounted on the vehicle by using the target board connected to the vehicle by using the installation auxiliary jig.

According to the present disclosure, it is possible to provide the optical axis position adjuster and the optical axis position adjusting method capable of easily determining an installation position of the target board and adjusting the optical axis position of the camera mounted on the vehicle without performing marking for visualizing the vehicle centerline.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a schematic diagram of an optical axis position adjuster and a vehicle according to the present embodiment;

FIG. 4A is a schematic diagram comparing the prior art and the present embodiment, and is a schematic diagram of an optical axis center used for camera-recognition before and after optical axis position adjustment;

FIG. 4B is a schematic diagram comparing the prior art and the present embodiment, and is a schematic diagram of an optical axis center used for camera-recognition before and after optical axis position adjustment;

FIG. 5 is a flowchart of the optical axis position adjustment method according to the present embodiment;

DETAILED DESCRIPTION OF EMBODIMENTS

Figure 2A:
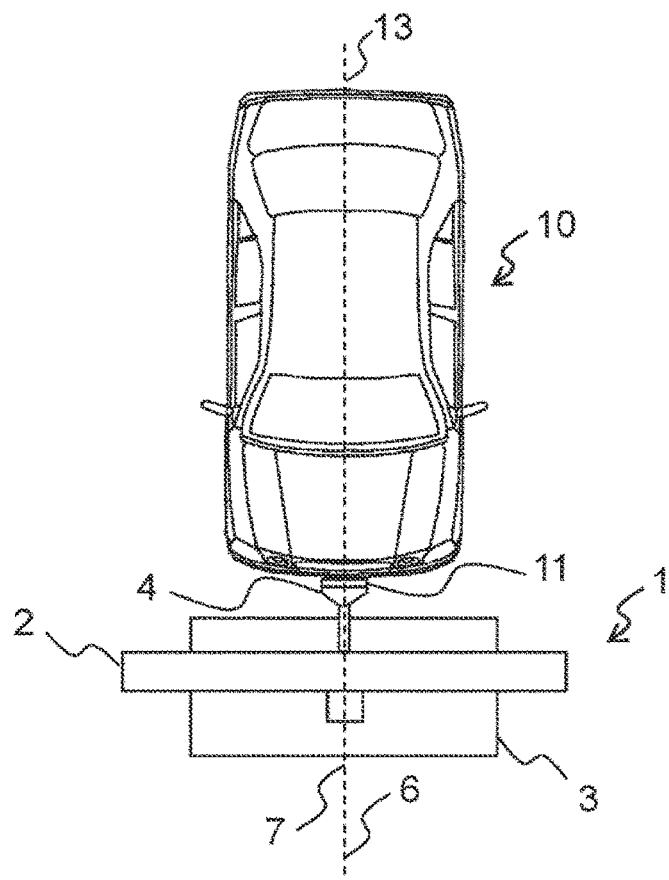
FIG. 2A is a schematic diagram showing the positional relation between the car and the optical axis position adjuster when adjusting the optical axis position of the camera.

FIG. 1 discloses an optical axis position adjuster 1 and a vehicle 10 according to the present embodiment.

The optical axis position adjuster 1 is used to adjust the optical axis position of the camera 12 mounted on the vehicle 10. The camera 12 is mounted, for example, for recognition of a situation in front of the vehicle 10. An object existing in front of the vehicle 10 is recognized from an image captured by the camera 12, and an action based on the recognition result is executed in the vehicle 10. The action to be performed varies depending on the type of the vehicle 10. The vehicle 10 may be a manually-driven vehicle driven by a driver riding on the vehicle 10, a remotely-driven vehicle remotely driven by an operator at a remote location, or an automatically-driven vehicle autonomously driven by an automated driving system. For example, when the vehicle 10 is an autonomous vehicle, a determination based on the recognition result is performed by the autonomous driving system, and the actuator is operated in accordance with the determination.

The optical axis position adjuster 1 includes a target board 2, a leg portion 3 that supports the target board 2, and an installation auxiliary jig 4 attached to the leg portion 3. The leg portion 3 has a connecting portion 5 for connecting the installation auxiliary jig 4.

The target board 2 is a rectangular plate on which a pattern for adjusting the optical axis position of the camera 12 is drawn. By executing a predetermined program in the computer that controls the camera 12, the optical axis position of the camera 12 is adjusted using a pattern drawn on the target board 2 as a landmark.

The leg portion 3 comprises a base installed on the ground and a strut extending vertically from the base. The target board 2 is attached to a post. In use of the optical axis position adjuster 1, the leg portion 3 is installed such that the base is horizontal with respect to the ground. The connecting portion 5 for connecting the installation auxiliary jig 4 is provided on the support. The connecting portion 5 is a groove formed in the longitudinal direction along a straight line passing through the center in the width direction of the support column in a front view.

The installation auxiliary jig 4 is a jig used for connecting the leg portion 3 to the vehicle 10. The installation auxiliary jig 4 is mounted so as to be movable along the connecting portion 5, that is, along the groove in the longitudinal direction of the support column.

Figure 2B:
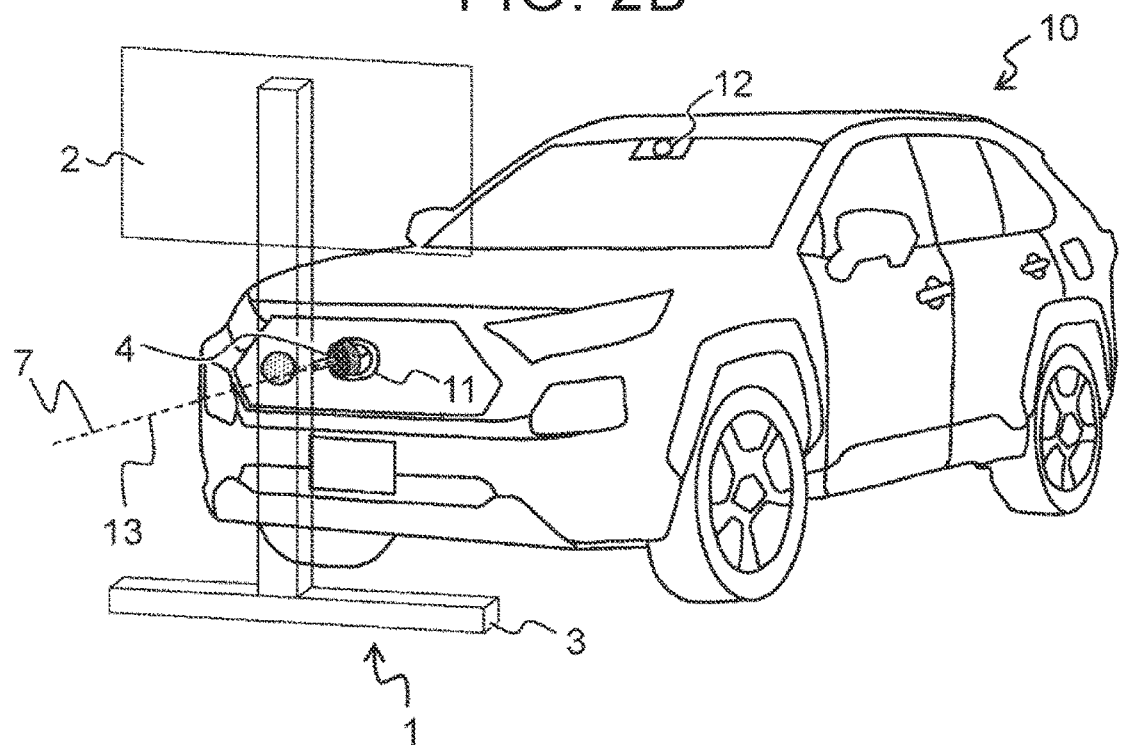
FIG. 2B is a schematic diagram showing the positional relation between the car and the optical axis position adjuster when adjusting the optical axis position of the camera.

FIGS. 2A and 2B are schematic diagrams illustrating the positional relation between the vehicles 10 and the optical axis position adjuster 1 when the optical axis position adjustment of the cameras 12 is performed.

FIG. 2A shows a positional relation between an optical axis position adjuster 1 and vehicles 10 in a plan view.

The optical axis position adjuster 1 is disposed in front of the eye of the vehicle 10, and is connected to the vehicle 10 by an installation auxiliary jig 4. Specifically, an emblem 11 provided in front of the vehicle 10 and an installation auxiliary jig 4 are connected. When the optical axis position adjuster 1 is connected to the emblem 11 by the installation auxiliary jig 4, the target board centerline 6 (hereinafter, referred to as the target board centerline 6) in a plan view coincides with the vehicle centerline 13 passing through the center of the vehicle width of the front and rear of the vehicle 10.

Note that the leg portion 3 supports the target board 2 such that the centerline of the width of the leg portion 3, that is, the leg portion centerline 7 passing through the centerline of the width of the support column and the target board centerline 6 passing through the center of the target board 2 in the width direction overlap in plan view. Therefore, when the leg portion 3 and the vehicle 10 are connected by the installation auxiliary jig 4 and the leg portion centerline 7 and the vehicle centerline 13 coincide with each other, the target board centerline 6 and the vehicle centerline 13 also coincide with each other.

The installation auxiliary jig 4 is connected to the vehicle 10 so as to be rotatable about a direction in which the vehicle centerline 13 extends as an axis. More specifically, the installation auxiliary jig 4 is rotatably connected to the vehicle 10 about the above-described axis, but is attached to the connecting portion 5 while being restricted from rotating with respect to the leg portion 3. Therefore, the leg portion 3 and the installation auxiliary jig 4 are integrally connected to the vehicle 10 so as to be rotatable about the axis.

The connecting portion 5 is located on the leg portion centerline 7 in a plan view. Since the connecting portion 5 is a groove, the installation auxiliary jig 4 can slide in the vertical direction along the groove. The connecting portion 5 has a role of absorbing the positional deviation of the vehicle centerline 13 and the leg portion centerline 7 in the vertical direction by sliding the installation auxiliary jig 4.

FIG. 2B shows the positional relation between the optical axis position adjuster 1 and the vehicles 10 in stereoscopic vision.

The vehicle 10 includes an emblem 11 in the front. In the present embodiment, the emblem 11 is provided at the center of the vehicle 10 in the vehicle width direction, and a line passing through the center of the emblem 11 is defined as the vehicle centerline 13. Further, in the present embodiment, a line passing through the center of the installation auxiliary jig 4 is defined as the leg portion centerline 7.

Although the height of the emblem 11 varies depending on the vehicle type, the difference in the height of each vehicle type is absorbed by adjusting the height of the installation auxiliary jig 4 at the connecting portion 5. Note that the emblem 11 is an example of a mark indicating the position of the vehicle centerline 13. Essentially, the vehicle 10 may be provided with a mark indicating the center of the vehicle 10 in the vehicle width direction.

Figure 3:
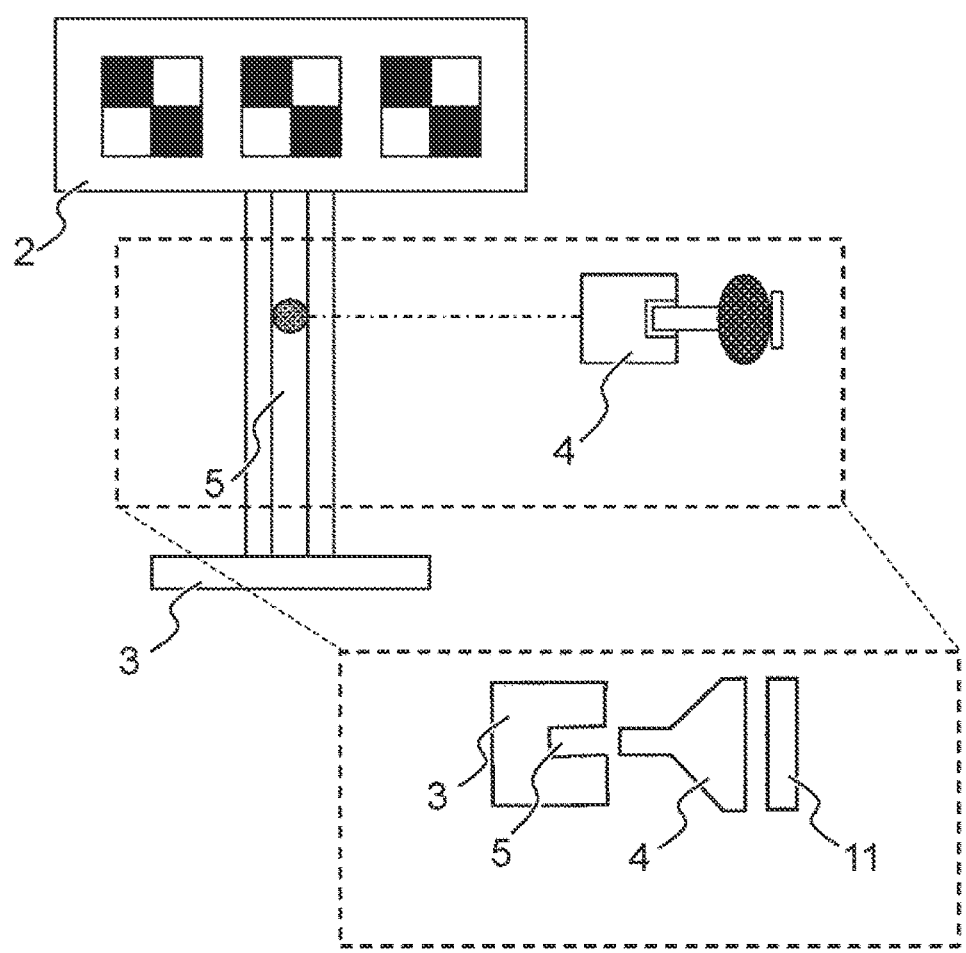
FIG. 3 is a schematic diagram of an installation auxiliary jig according to the present embodiment.

FIG. 3 is a schematic diagram illustrating a state in which the installation auxiliary jig 4 is connected to the emblem 11.

The installation auxiliary jig 4 is connected to the leg portion 3 by being fitted into a groove of the connecting portion 5. Further, the installation auxiliary jig 4 is connected to the emblem 11. The connection method of the installation auxiliary jig and the emblem 11 is preferably a detachable connection method. For example, in the present embodiment, it is assumed to be connected by a magnet. The installation auxiliary jig 4 may be connected to a license plate or a license plate holding portion, a bumper of the vehicle 10, or an undercover of the vehicle 10 as long as it is a portion through which the vehicle centerline 13 passes in a plan view.

FIG. 4A is a schematic diagram for comparing the support method of the target board 2 in the prior art and the support method of the target board 2 in the present embodiment when the vehicles 10 are inclined with respect to the ground. FIG. 4B is a schematic diagram for comparing optical axis centers used for recognition by the camera 12 before and after adjusting the optical axis position according to the present embodiment.

One of the conventional techniques is to adjust the position of the optical axis of the camera 12 by installing the target board 2 on the vehicle 10 as shown in the left-hand view of FIG. 4A. The target board 2 is fixed, for example, on a hood of the vehicle 10 using a specific fixture or the like.

In the optical axis position adjusting process of the camera 12 shown in the left-hand side of FIG. 4A, the target board 2 is installed in the vehicle 10, thereby simplifying the marking operation for drawing the centerline of the vehicle 10, which is usually performed by a plurality of persons.

In the left-hand side view of FIG. 4A, a straight line passing through the center of the emblem 11 of the vehicle 10 and extending vertically is referred to as a straight line 14. The process shown in the left-hand diagram of FIG. 4A is performed on the assumption that the vehicle 10 is horizontal with respect to the ground, that is, the straight line 14 overlaps with the target board front-view centerline 15 (hereinafter, referred to as the target board front-view centerline 15) in the front view.

However, when the vehicle 10 is not horizontal with respect to the ground as shown in the left-hand diagram in FIG. 4A, the target board 2 installed in the vehicle 10 is also not horizontal. Therefore, the straight line 14 and the target board front-view centerline 15 do not coincide with each other, and there is a possibility that the optical axis position adjustment of the camera 12 becomes inaccurate. In addition, there is a possibility that the optical axis position adjustment of the camera 12 may be inaccurate due to a positional deviation when the camera 12 is mounted on the vehicle 10.

Furthermore, the methods in the left-hand side view of FIG. 4A require an instrument for securing the target board 2 to the vehicles 10. It is difficult to say that the fixture for adjusting the optical axis position of the camera 12 to all the vehicles 10 at the time of shipment is efficient from the viewpoint of cost.

In the right-hand view of FIG. 4A, the target board 2 is supported by the leg portions 3, and the positional relation between the optical axis position adjuster 1 of the camera 12 and the vehicle 10 is viewed from the front side of the vehicle 10.

In the right-hand view of FIG. 4A, the emblem 11 provided in front of the vehicles 10 is connected to the installation auxiliary jig 4. The installation auxiliary jig 4 rotatably connects the leg portion 3 to the vehicle 10. Therefore, even when the vehicle 10 is not arranged horizontally with respect to the ground, the leg portions 3 can be arranged horizontally with respect to the ground, and the target board 2 supported by the leg portions 3 can also pass through the center of the emblem 11 and remain horizontally with respect to the ground. Therefore, according to the present embodiment, it is possible to easily and accurately adjust the optical axis position of the camera 12 mounted on the vehicle 10.

FIG. 4B is a schematic diagram of an optical axis position of a camera 12. More specifically, the left-hand diagram in FIG. 4B shows a schematic diagram prior to the optical axis position adjustment, in which the optical axis center 121a used to recognize the camera-12 and the physical optical axis center 121b do not coincide with each other. Further, a schematic diagram after adjusting the optical axis position in which the optical axis center 121a and the physical optical axis center 121b used for recognizing the camera 12 coincide with each other is shown in the right diagram of FIG. 4B.

In the left-hand side view of FIG. 4B, the optical axis center 121a and the physical optical axis center 121b used for recognizing the position of the optical axis before adjusting the position of the optical axis of the camera 12 are shown. The optical axis center 121a used for recognition is an intersection point with a vertically extending straight line 123 that is present on the horizontal line 122 recognized by the camera 12 and recognized by the camera 12. Before adjusting the optical axis position, the camera 12 recognizes the target object with reference to the optical axis center 121a. The physical optical axis center 121b is an optical axis center for correctly recognizing a target, and is an intersection point of the target board front-view centerline 15 and a straight line 124 that intersects perpendicularly with the target board front-view centerline 15. The straight line 124 is a horizontal line with respect to the ground when the target board 2 is installed horizontally with respect to the ground.

The left-hand side view of FIG. 4B shows that the camera 12 cannot correctly recognize the target object because the optical axis center 121a and the physical optical axis center 121b do not coincide with each other. The optical axis position adjustment is to adjust the optical axis center 121a so that the two optical axis centers 121a and 121b coincide with each other.

In the right-hand side view of FIG. 4B, the optical axis center 121a is used to recognize the position of the optical axis of the camera 12 after adjusting the position of the optical axis. The camera 12 determines a horizontal line 122 with respect to the target board 2. That is, the camera 12 is adjusted so as to recognize that the straight line 124 is the horizontal line 122. Similarly, the camera 12 also determines a straight line 123 extending in the vertical direction recognized by the camera 12 with respect to the target board 2. That is, the camera 12 is adjusted so as to recognize that it is a straight line 123 extending in the vertical direction from the target board front-view centerline 15. With the above adjustment, the camera 12 can correctly recognize the front target.

FIG. 5 is a flowchart of an optical axis position adjusting method performed using the optical axis position adjuster 1, that is, an optical axis position adjusting method according to the present embodiment.

First, in S100, the installation auxiliary jig 4 is attached to a location where the center position of the vehicles 10 is known, that is, to the emblem 11.

Next, in S200, the leg portions 3 supporting the target board 2 are placed against the ground.

Next, in S300, the connecting portion 5 of the leg portions 3 is assembled to the installation auxiliary jig 4.

Finally, in S400, the optical axis position of the camera 12 is adjusted using the target board 2.

The above is the procedure of the vehicle inspection method according to the present embodiment.

Figure 6A:
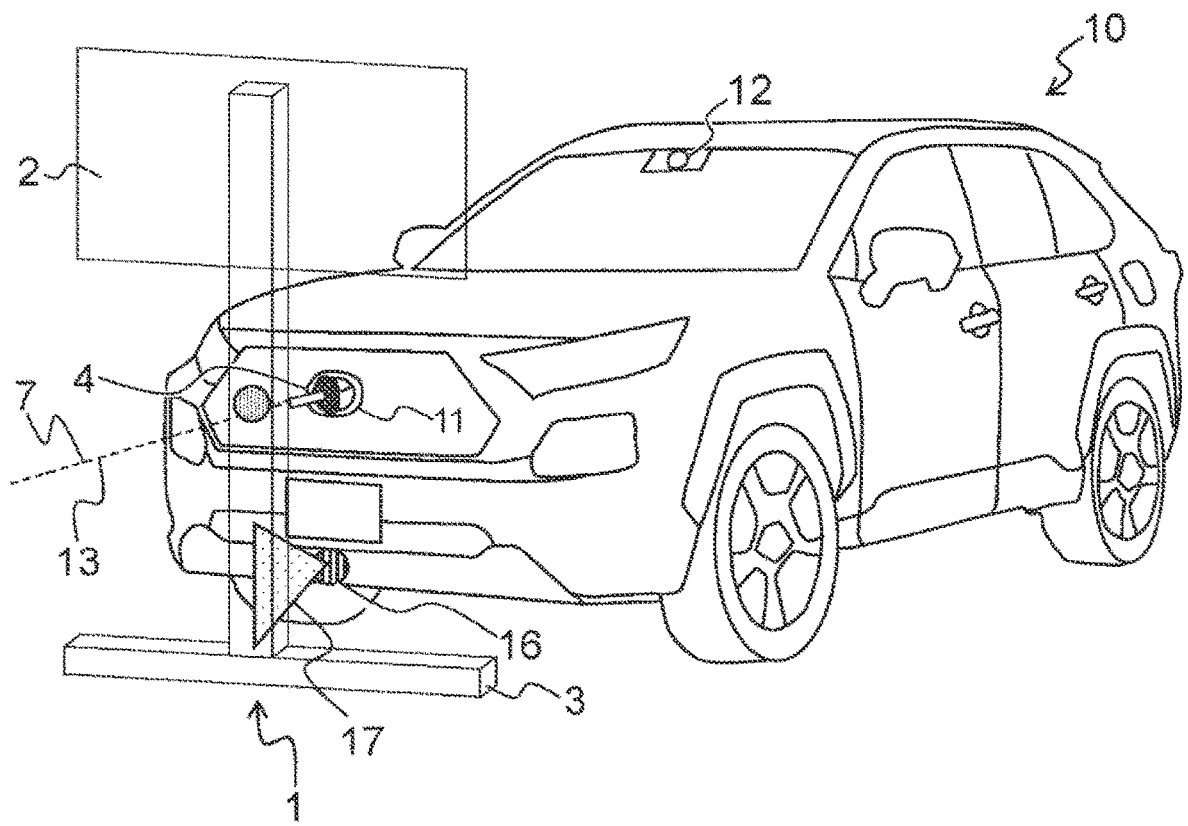
FIG. 6A is a schematic diagram of a modification of optical axis position adjusting process.
Figure 6B:
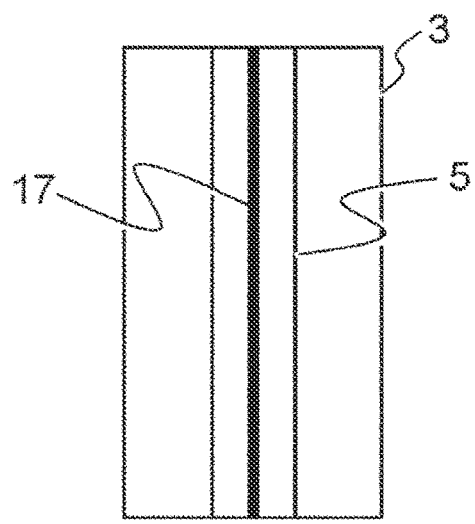
FIG. 6B is a schematic diagram of a modification of optical axis position adjusting process.

FIGS. 6A and 6B are schematic diagrams of a modification of the optical axis position adjusting method using the optical axis position adjuster 1. In a variant, the vehicle 10 further comprises a light-emitting device 16 in front. The light emitting device 16 is a device capable of irradiating the front of the vehicle 10 with the laser beam 17. FIG. 6A shows the positional relation between the vehicles 10 including the light-emitting device 16 and the optical axis position adjuster 1, and FIG. 6B shows that the laser beam 17 enters the slot of the connecting portion 5 provided in the leg portions 3.

The light emitting device 16 emits laser beam 17 in front of the vehicle 10 so as to extend in the vertical direction. When the optical axis position adjuster 1 is installed, the installation position of the leg portion 3 is adjusted so that the laser beam 17 enters the groove of the connecting portion 5 provided in the leg portion 3. When the laser beam 17 irradiated by the light emitting device 16 enters the groove of the connecting portion 5, the optical axis position adjuster 1 is correctly arranged with respect to the vehicle 10.

According to the modification, even when the front shape of the vehicle is different, it is possible to accurately adjust the optical axis position of the camera 12 by using the same optical axis position adjuster.

What is claimed is:
1. An optical axis position adjuster comprising:
a target board adjusting an optical axis position of a camera mounted on a vehicle;
a leg portion supporting the target board; and
an installation auxiliary jig that connects the leg portion to the vehicle such that a vehicle centerline passing through a center of a vehicle width of the vehicle in a top-down view coincides with a leg portion centerline passing through a center of a width of the leg portion in the top-down view, wherein the leg portion has a connecting portion connecting the installation auxiliary jig and the leg portion, the connecting portion is a groove formed in a longitudinal direction along a straight line passing through the center of the width of the leg portion in the top-down view, and the installation auxiliary jig slides in a vertical direction in the groove and adjusts a vertical position thereof.

2. The optical axis position adjuster according to claim 1, wherein the leg portion supports the target board such that the leg portion centerline overlaps with a target board centerline passing through a widthwise center of the target board in the top-down view.

3. The optical axis position adjuster according to claim 1, wherein the installation auxiliary jig is connectable to an emblem provided in a front portion of the vehicle.

4. The optical axis position adjuster according to claim 1, wherein the installation auxiliary jig connects the leg portion to the vehicle such that the leg portion is rotatable about an axis perpendicular to a plane to which the target board extends.

5. A vehicle inspection method comprising:
a step of installing a leg portion supporting a target board to a ground such that the target board is perpendicular to the ground;
a step of connecting the leg portion and a vehicle with an installation auxiliary jig such that a vehicle centerline passing through a center of a vehicle width of the vehicle in a top-down view coincides with a leg portion centerline passing through a center of a width of the leg portion in the top-down view;
a step of adjusting a height of the installation auxiliary jig in a groove formed in a longitudinal direction along a straight line passing through the center of the width of the leg portion in the top-down view; and
a step of adjusting an optical axis position of a camera mounted on the vehicle by using the target board connected to the vehicle by using the installation auxiliary jig.

6. The optical axis position adjuster according to claim 1, wherein the target board is a rectangular plate on which a pattern is present, and the pattern is a checkerboard pattern.

7. The optical axis position adjuster according to claim 6, wherein the checkerboard pattern comprises a plurality of the checkerboard pattern arranged along a horizontal direction of the target board.

8. The optical axis position adjuster according to claim 6, wherein the target board comprises three of the pattern.

9. The vehicle inspection method according to claim 5, further comprising a step of aligning the installation auxiliary jig such that a laser beam, which is emitted in a vertical direction from a front portion of the vehicle, enters the groove.

* * * * *